(12) United States Patent
Demsey

(10) Patent No.: US 10,616,365 B2
(45) Date of Patent: *Apr. 7, 2020

(54) SYSTEMS AND METHODS FOR UTILIZING UNUSED NETWORK CAPACITY FOR PREFETCH REQUESTS

(71) Applicant: OATH (AMERICAS) INC., New York, NY (US)

(72) Inventor: Seth Mitchell Demsey, Dulles, VA (US)

(73) Assignee: Verizon Media Inc., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/239,220

(22) Filed: Jan. 3, 2019

(65) Prior Publication Data

US 2019/0141160 A1    May 9, 2019

Related U.S. Application Data

(63) Continuation of application No. 15/196,659, filed on Jun. 29, 2016, now Pat. No. 10,218,811.

(51) Int. Cl.
*G06F 15/173* (2006.01)
*H04L 29/08* (2006.01)
*H04L 12/26* (2006.01)
*H04W 24/02* (2009.01)
*H04W 24/08* (2009.01)

(52) U.S. Cl.
CPC ...... *H04L 67/2847* (2013.01); *H04L 43/0817* (2013.01); *H04L 43/0876* (2013.01); *H04L 67/22* (2013.01); *H04W 24/02* (2013.01); *H04W 24/08* (2013.01)

(58) Field of Classification Search
CPC . H04L 67/2847; H04L 67/22; H04L 43/0817; H04L 43/0876; H04W 24/08; H04W 24/02
See application file for complete search history.

(56) References Cited

U.S. PATENT DOCUMENTS

| 6,055,572 | A | 4/2000 | Saksena |
|---|---|---|---|
| 10,218,811 | B1 * | 2/2019 | Demsey ............ H04L 67/2847 |
| 2003/0182437 | A1 | 9/2003 | Kobayashi et al. |
| 2011/0320804 | A1 | 12/2011 | Chan et al. |
| 2012/0066677 | A1 | 3/2012 | Tang |
| 2012/0151000 | A1 | 6/2012 | Snodgrass et al. |

(Continued)

*Primary Examiner* — John B Walsh
(74) *Attorney, Agent, or Firm* — Bookoff McAndrews, PLLC

(57) ABSTRACT

Methods, systems, and computer-readable media are disclosed for utilizing unused network capacity for prefetch requests. One method includes: receiving, over a network, network traffic information from a network provider of the network; determining a threshold value for prefetch request fulfillment based on the received network traffic information; receiving, over the network, a plurality of prefetch requests from an application running on a mobile device connected to the network of the network provider; determining, for each prefetch request of the plurality of prefetch requests, a score for the prefetch request based on the received plurality of prefetch requests; and responding to, for each prefetch request of the plurality of prefetch requests, the prefetch request based on the determined threshold value and the determined score for the prefetch request.

20 Claims, 7 Drawing Sheets

(56) References Cited

U.S. PATENT DOCUMENTS

| | | |
|---|---|---|
| 2014/0188976 A1 | 7/2014 | Plamondon |
| 2015/0215816 A1 | 7/2015 | Abou-Elkheir et al. |
| 2015/0373153 A1 | 12/2015 | Jenkins |
| 2016/0239425 A1 | 8/2016 | Chan et al. |
| 2016/0357677 A1 | 12/2016 | Hooker et al. |
| 2017/0118273 A1 | 4/2017 | Hipsh et al. |
| 2017/0123985 A1 | 5/2017 | Hooker et al. |

\* cited by examiner

SYSTEMS AND METHODS FOR UTILIZING UNUSED NETWORK CAPACITY FOR PREFETCH REQUESTS

CROSS-REFERENCE TO RELATED APPLICATION(S)

This patent application is a continuation of and claims the benefit of priority to U.S. application Ser. No. 15/196,659, filed on Jun. 29, 2016, the entirety of which is incorporated herein by reference.

TECHNICAL FIELD

The present disclosure relates to enabling service providers to utilize unused network capacity that would otherwise be wasted. More particularly, the present disclosure relates to utilizing unused network capacity for prefetching requests.

BACKGROUND

Mobile wireless communication networks have finite resources which are typically shared among multiple mobile devices that access different services. Such services may include, for example, video streaming and/or interactive messaging, e-mail, text messaging, web surfing, etc. Applications using different services can place varied demands on the wireless communication network. To address these demands, a network's capacity is often larger than the amount used at any given time, in order to provide an acceptable quality of experience for all of the users and their respective applications.

However, there continues to be an increasing demand on mobile wireless communication networks because of the increasing proliferation of mobile devices and increasing use of applications and services (e.g., video and music services). Mobile broadband (i.e., network access via cellular telephone tower and/or satellite link), in particular, has become overburdened, especially during certain times of the day. Because the available mobile broadband spectrum is non-renewable and limited, there is an increased motivation to make more efficient use of the full capacity of a network during peak use times and non-peak use times.

Thus, embodiments of the current disclosure relate to improving utilization of unused network capacity during peak use times and non-peak use times, and, more particularly, to utilization of unused network capacity for fulfilling prefetch requests.

SUMMARY OF THE DISCLOSURE

Embodiments of the present disclosure include systems, methods, and computer-readable media for utilizing unused network capacity for prefetch requests.

According to embodiments of the present disclosure, computer-implemented methods are disclosed for utilizing unused network capacity for prefetch requests. One method includes: receiving, over a network at one or more servers, network traffic information from a network provider of the network; determining, by the one or more servers, a threshold value for prefetch request fulfillment based on the received network traffic information; receiving, over the network at the one or more servers, a plurality of prefetch requests from an application running on a mobile device connected to the network of the network provider; determining, for each prefetch request of the plurality of prefetch requests by the one or more servers, a score for the prefetch request based on the received plurality of prefetch requests; and responding to, for each prefetch request of the plurality of prefetch requests by the one or more servers, the prefetch request based on the determined threshold value and the determined score for the prefetch request.

According to embodiments of the present disclosure, systems are disclosed for utilizing unused network capacity for prefetch requests. One system includes a data storage device that stores instructions system for utilizing unused network capacity for prefetch requests; and a processor configured to execute the instructions to perform a method including: receiving, over a network, network traffic information from a network provider of the network; determining a threshold value for prefetch request fulfillment based on the received network traffic information; receiving, over the network, a plurality of prefetch requests from an application running on a mobile device connected to the network of the network provider; determining, for each prefetch request of the plurality of prefetch requests, a score for the prefetch request based on the received plurality of prefetch requests; and responding to, for each prefetch request of the plurality of prefetch requests, the prefetch request based on the determined threshold value and the determined score for the prefetch request.

According to embodiments of the present disclosure, non-transitory computer-readable media storing instructions that, when executed by a computer, cause the computer to perform a method for utilizing unused network capacity for prefetch requests are also disclosed. One method of the non-transitory computer-readable medium including: receiving, over a network, network traffic information from a network provider of the network; determining a threshold value for prefetch request fulfillment based on the received network traffic information; receiving, over the network, a plurality of prefetch requests from an application running on a mobile device connected to the network of the network provider; determining, for each prefetch request of the plurality of prefetch requests, a score for the prefetch request based on the received plurality of prefetch requests; and responding to, for each prefetch request of the plurality of prefetch requests, the prefetch request based on the determined threshold value and the determined score for the prefetch request.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the scope of disclosed embodiments, as set forth by the claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

Figure 1:
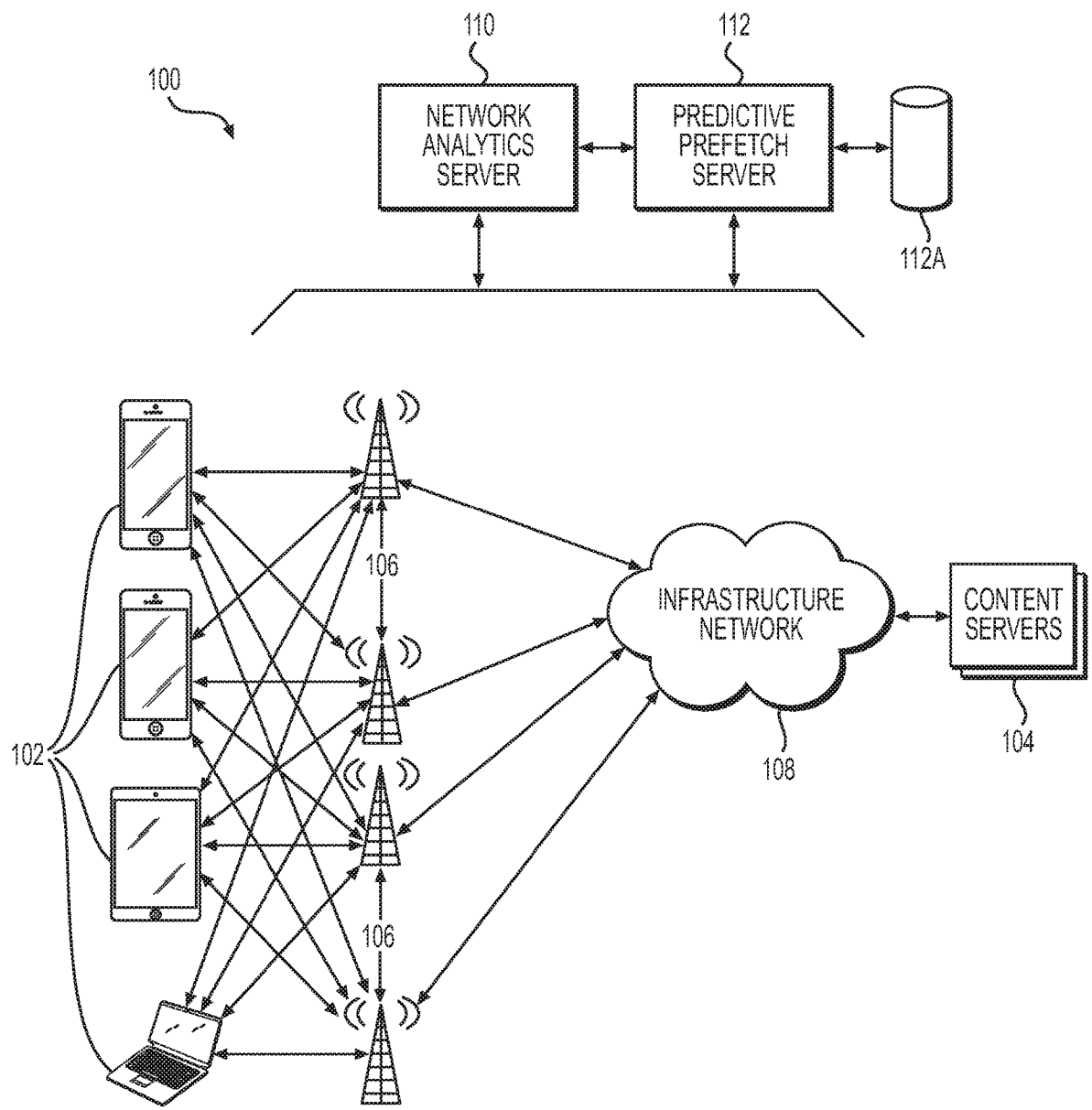
FIG. 1 depicts a schematic diagram of a network environment for a method of utilizing unused network capacity for prefetch requests, according to embodiments of the present disclosure.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION OF EMBODIMENTS

The following detailed description refers to the accompanying drawings. The same reference numbers in different drawings may identify the same or similar elements.

Systems and methods described herein enable wireless service providers to identify, offer, and monetize unused network capacity that would otherwise be wasted. The systems and methods may allow for unused capacity to be used for prefetching requests from applications running on mobile devices, and may be used to determine which prefetch requests to fulfill. In a conventional system, a wireless service provider may allow network capacity to remain unused when not at a peak use time. Also, in a conventional system, applications and/or application providers are unable to utilize the unused network capacity. For example, an application that uses prefetch requests may incur network usage charges for a user of the application whether the user eventually requests the content of the prefetch requests or not. Embodiments described herein may allow applications and application providers to utilize unused network capacity for prefetch requests, and may allow for "charging" the user for the data associated with the prefetch requests only if the user actually requests the content of the prefetch request.

According to one implementation, a predictive prefetch server may receive wireless network utilization information from a wireless network provider and may receive prefetch requests from mobile devices of users that utilize the wireless network of the wireless network provider. Upon receiving the wireless network utilization information, the predictive prefetch server may determine a threshold value based on the wireless network utilization information for the wireless network. The predictive prefetch server may also examine, score, and rank each prefetch request received from the mobile device. Based on the determined threshold value and the ranking of the prefetch request, the predictive prefetch server may determine which prefetch request to fulfill.

Additionally, the predictive prefetch server may also receive content requests from a user of the mobile device. The content requests may include requests made by the user in a non-prefetch capacity. The content requests and prefetch requests may be used to build a prefetch model, which may be used to more accurately score and rank prefetch request and may be used to detect for fraudulent prefect requests.

FIG. 1 depicts a diagram of an exemplary electronic network environment 100 for utilizing unused wireless network capacity for prefetching requests, according to embodiments of the present disclosure. As shown in FIG. 1, the electronic network environment 100 may include a plurality of mobile devices 102, a plurality of content servers 104, a plurality of nodes 106, an infrastructure network 108, a network analytics server 110, and a predictive prefetch server 112. For ease of explanation, only a limited number of network elements are shown in the electronic network environment 100 depicted in FIG. 1. However, it should be understood that a greater number of network elements may be part of the electronic network environment 100, including other types of known network entities not illustrated in FIG. 1. Other embodiments may include additional or different network entities in alternative configurations than which are exemplified in FIG. 1. Additionally, embodiments described herein may be presented within the context of the wireless communication networks for ease of explanation. However, aspects of the present disclosure are not restricted to the wireless communication networks.

The plurality of mobile devices 102 may communicate with infrastructure network 108 through the plurality of nodes 106 (e.g., wireless network antennas) via a wireless connection. The infrastructure network 108 may be used to transmit data between the plurality of mobile devices 102 and the plurality of content servers 104 via one or more nodes 106.

Mobile devices 102 may include software applications with a variety of functionalities. A software application running on mobile device 102 may log the content consumption by a user of the mobile device 102. The software application may use the log of content consumed by the user to determine a prefetch request or a set of prefetch requests to transmit to the predictive prefetch server 112. The software applications may transmit prefetch requests for content, such web pages, videos, images, and files, for potential future access by a user of the mobile device 102. For example, a user of mobile device may enter an address (e.g., a URL) of a desired web page and based on the log of content consumed by the user, corresponding web pages may be requested to be prefetched for potential future use by the user of mobile device 102. Once a prefetch request is fulfilled, the file for each corresponding web page may be stored in a memory of the mobile device 102 for instant access by the user.

Each time an application transmits a content request, the application may check the memory of the mobile device 102 to determine whether the content has been previously stored, and may provide the content for display to the user from the memory when the content is present in the memory. For example, if the content has been previously stored in the memory, the application may retrieve the content from the memory of the mobile device 102, which is relatively faster than retrieving the content from over the network.

The network analytics server 110 may communicate with network elements throughout the electronic network environment 100 to manage and monitor data transmitted between the devices. For example, the network analytics server 110 may receive traffic measurements and network element status from the plurality of mobile devices 102, the plurality of nodes 106, and/or network elements within the infrastructure network 108. Based upon the traffic measurements and/or the network element status received, network analytics server 110 may measure the capacity of the infrastructure network 108, and may provide the unused capacity information to the predictive prefetch server 112. The network analytics server 110 may transmit unused capacity information to predictive prefetch server 112 at predetermined intervals (e.g., every second or few seconds) to provide a real-time or near-real-time status of the network environment 100.

Additionally, or alternatively, network analytics server 110 may measure traffic data throughput for the entire network at a granular level. In one embodiment of the present disclosure, raw traffic data may be collected across the plurality of mobile devices 102, the plurality of nodes 106, and/or network elements within the infrastructure network 108 to measure traffic flow. Raw traffic data from network analytics server 110 may be transmitted to predictive prefetch server 112 at predetermined intervals (e.g., every second or few seconds) to provide a real-time or near-real-time status of the network environment 100. The raw traffic data may be analyzed by predictive prefetch server 112 to determine an amount of unused capacity. A relatively high amount of unused capacity in network environment 100 may allow for a relatively higher threshold value for fulfilling more prefetch requests. The dynamic threshold value enables a wireless service provider for the plurality of mobile devices 102, the plurality of nodes 106, and/or network elements within the infrastructure network 108 to utilize otherwise unused network capacity.

As discussed above, the predictive prefetch server 112 may receive one or more of unused capacity information and raw traffic data from network analytics server 110, and determine a threshold value based on one or more of unused capacity information and raw traffic data. For example, the predictive prefetch server 112 may convert raw traffic data from network analytics server 110 into a quantifiable network capacity measure that may be used to determine unused network capacity. The determined unused network capacity may then be used to fulfill prefetch requests from one or more mobile devices 102. In one embodiment, network analytics server 110 and/or the predictive prefetch server 112 may compare raw traffic data against a maximum network capacity to determine an unused network capacity.

Upon receiving the unused network capacity or determining the unused network capacity, the predictive prefetch server 112 may determine a threshold value of a number of prefetch requests to fulfill. For example, when the averaged unused network capacity is about 90% of a maximum network capacity, the threshold value may be from about 0% to about 90% of the prefetch request fulfillment. When the unused network capacity is about 10% of the maximum network capacity, the network utilization may be about 0% to about 10%. Alternatively, a particular utilization threshold percentage (e.g., such as 70%, 80%, or 90%) of the unused network capacity may be used to fulfill prefetch request. As mentioned above, the unused network capacity is a dynamic value, and the predictive prefetch server may dynamically adjust the threshold value based on the received and/or determined unused network capacity.

One or more applications running on the mobile device 102 may also transmit prefetch requests to the predictive prefetch server 112. The predictive prefetch server 112 may then score each prefetch request received from the mobile device 102 based on a likelihood that the user of the mobile device 102 may request the content of the prefetch request. The predictive prefetch server 112 may also review the prefetch requests from mobile device 102 and determine a significance of the content of each request. For example, rapidly changing content, such as status updates and news feeds, may have a lower score and a lower rank, while static content, such as a news article or a video, may have a higher score and a higher rank. Alternatively, rapidly changing content, such as status updates and news feeds, may have a higher score and a higher rank, while static content, such as a news article or a video, may have a lower score and a lower rank After scoring each prefetch request, the predictive prefetch server 112 may rank the scored prefetch requests. Then, the predictive prefetch server 112 may fulfill all or a percentage of the ranked prefetch requests based on the threshold value. For example, the predictive prefetch server 112 may fulfill the prefetch requests at or above the threshold value. Additionally, or alternatively, the predictive prefetch server 112 may respond to the prefetch requests based on the threshold value and the score for the prefetch request. For example, if the score of the prefetch request is greater than or equal to the determined threshold value, then the one or more servers may respond to the prefetch request by fulfilling the prefetch requests. However, if the score of the prefetch request is less than the determined threshold value, then the one or more servers may not respond to the prefetch request.

Alternatively, or additionally, the predictive prefetch server 112 may transmit instructions to a server of the network provider, such as network analytics server 110 and/or a network element of infrastructure network 108, to provide a response to prefetch requests based on the score of each prefetch request and the threshold value.

The predictive prefetch server 112 may also score, rank, and fulfill prefetch requests based on a prefetch model built from user profiles. User activity with respect to content requests by the mobile device 102 may be monitored in order to build a predictive model to determine which prefetch requests to fulfill. The predictive prefetch server 112 may predict which prefetch requests the user is likely to request in the future. The predictive prefetch server 112 may also determine other content that the user of mobile device 102 may be predicted to be interested in receiving. The content is then prefetched and stored in a local memory of a mobile device 102 of the user for later retrieval and consumption by the user.

The predictive prefetch server 112 may analyze the content of a prefetch request and the content of the user requests from a mobile device 102 to determine which prefetch requests the user will be likely to request in the near future. Content may include any form of information accessible to the mobile device 102 from content servers 104 over infrastructure network 108, such as video, music, other audio files, websites, news, sports scores, and other forms of content. In addition, the predictive prefetch server 112 may profile the different content categories of the prefetch requests and requests of the user of the mobile device 102. These predictive prefetch models may be used to determine which responses to prefetch requests may be transmitted to the mobile device 102. The predictive prefetch server 112 may transmit the responses to the prefetch requests based on the threshold value determined from the unused network capacity and the predictive prefetch model.

Using the various user profiles and user-consumed content stored in a predictive prefetch database 112a, the predictive prefetch server 112 may build a prefetch model unique to each user of a mobile device 102. Additionally, or alternatively, the predictive prefetch server 112 may use user profiles and consumption patterns of other users to build a prefetch model unique to each user of a mobile device 102. The predictive prefetch model may be used to determine a score and a ranking of each prefetch request received from a mobile device 102. Additionally, or alternative, the predictive prefetch model may be used to predict whether a user will request content in the future, and transmit predicted content to mobile device 102.

When the predictive prefetch server 112 determines content to prefetch for the mobile device 102, the predictive prefetch server 112 may cache a response to the prefetch request in the user database 112a, and fulfill the prefetch request when the threshold value determined from the unused network capacity is at an acceptable level.

In some embodiments, the predictive prefetch server 112 may prefetch content that it recommends to a user of a mobile device 102 based on a prefetch model built from the profile of the user and past content requests. The recommended prefetch content may be transmitted to the mobile device 102 when the predictive prefetch server 112 determines that the threshold value of the unused network capacity is at an acceptable level.

The predictive prefetch server 112 may compile one or more profiles for each user of mobile devices 102 based on past behavior that models interest by the user in content (e.g., categories, genres, content types, etc.). Similarly, the predictive prefetch server 112 may build profiles for different content types in terms of their refresh rate (e.g., news ticker has a faster refresh rate than music videos).

Figure 2:
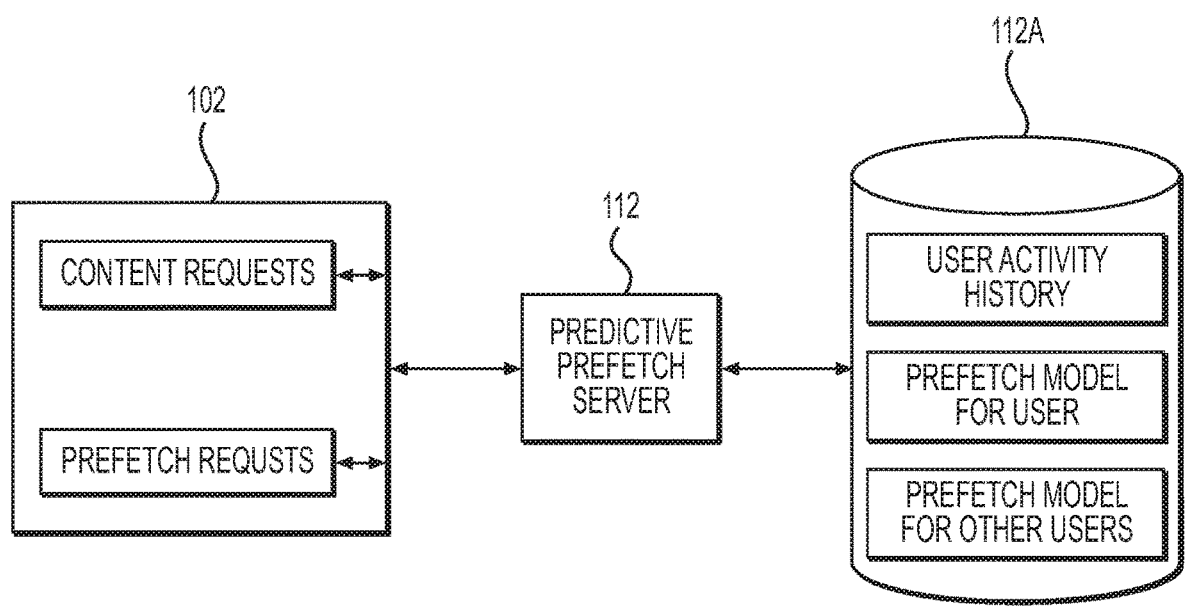
FIG. 2 depicts a block diagram of a predictive prefetch server utilizing a plurality of sources to build a prefetch model for a user of a mobile device, according to embodiments of the present disclosure.

As shown in FIG. 2, the predictive prefetch server 112 may build and/or update a prefetch model for a user of a mobile device 102 from a multitude of sources, such as, content requests from each mobile device 102, prefetch requests from each mobile device 102, user activity history stored in the predictive prefetch database 112a, a prefetch model of the user of mobile device 102 stored in the predictive prefetch database 112a, and prefetch models of other users of mobile devices stored in the predictive prefetch database 112a. User activity history may be a collection of information gathered about the user from previous prefetch requests and content requests from the mobile device 102 of the user, and include, for example, preferences, interactions, activities, locations, etc. of the user of mobile device 102. The predictive prefetch server 112 may also build the predictive prefetch model by reviewing the content requests and prefetch requests from mobile device 102 and determine the significance of the content of each request. For example, rapidly changing content, such as status updates and news feeds, may have a lower score and a lower rank, while static content, such as a news article or a video, may have a higher score and a higher rank.

The predictive prefetch server 112 may then optimize which prefetch request to fulfill and detect fraudulent prefetch requests received from mobile device 102. As mentioned above, the predictive prefetch server 112 may build the predictive prefetch models from interactive user input, user preferences, content preferences, and activity times. In this regard, the predictive prefetch server 112 may use the predictive prefetch model to determine whether prefetch requests received from the mobile device 102 of the user deviates from the predictive prefetch model of the user.

Figure 3:
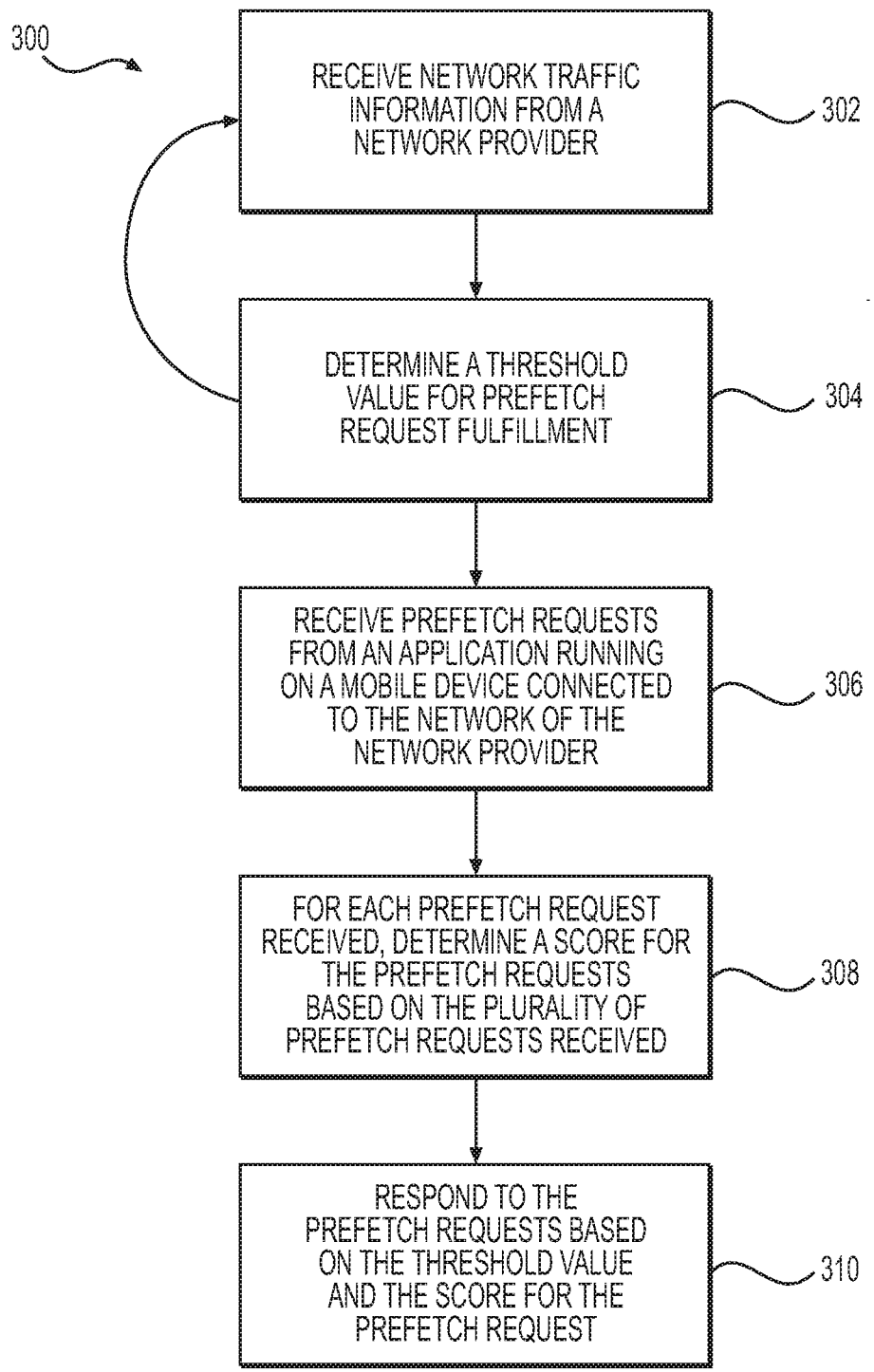
FIG. 3 depicts a block diagram of a method for utilizing unused network capacity for prefetch requests, according to embodiments of the present disclosure.

FIG. 3 depicts a block diagram of a method for utilizing unused network capacity for prefetch requests, according to embodiments of the present disclosure. The method 300 may begin at step 302 in which one or more servers, such as predictive prefetch server 112, may receive, via a network, network traffic information from a network provider. The network traffic information may include one or more of unused capacity information, raw traffic data, and/or a maximum network capacity.

The method may then proceed to step 304, in which the one or more servers may determine a threshold value for prefetch requests to fulfill based on the network traffic information. For example, the one or more servers may determine the threshold value may be a percentage of, or all, of the unused network capacity. As mentioned above, the unused network capacity may be a dynamic threshold value, and the one or more servers may dynamically determine the threshold value based on the received network traffic information.

Then, at step 306, the one or more servers, may receive a plurality of prefetch requests from an application running on a mobile device connected to the network of the network provider. Each prefetch request may include a request for content predicted to be requested by the user of the mobile device. Alternatively, or additionally, the one or more servers may receive the plurality of prefetch requests from an application server that transmits and receives data from the application running on the mobile device connected to the network of the network provider.

At step 308, the one or more servers may determine a score for each prefetch request based on the received plurality of prefetch requests and/or a plurality of prior prefetch requests. Finally, at step 310, the one or more servers may respond to the prefetch requests based on the threshold value and the score for the prefetch request. For example, if the score of the prefetch request is greater than or equal to the determined threshold value, then the one or more servers may respond to the prefetch request by fulfilling the prefetch requests. However, if the score of the prefetch request is less than the determined threshold value, then the one or more servers may not respond to the prefetch request. Alternatively, or additionally, the one or more servers may transmit instructions to a server of the network provider, such as network analytics server 110 or a network element of infrastructure network 108, to provide a response to prefetch requests based on the score of each prefetch requests and the threshold value.

Figure 4:
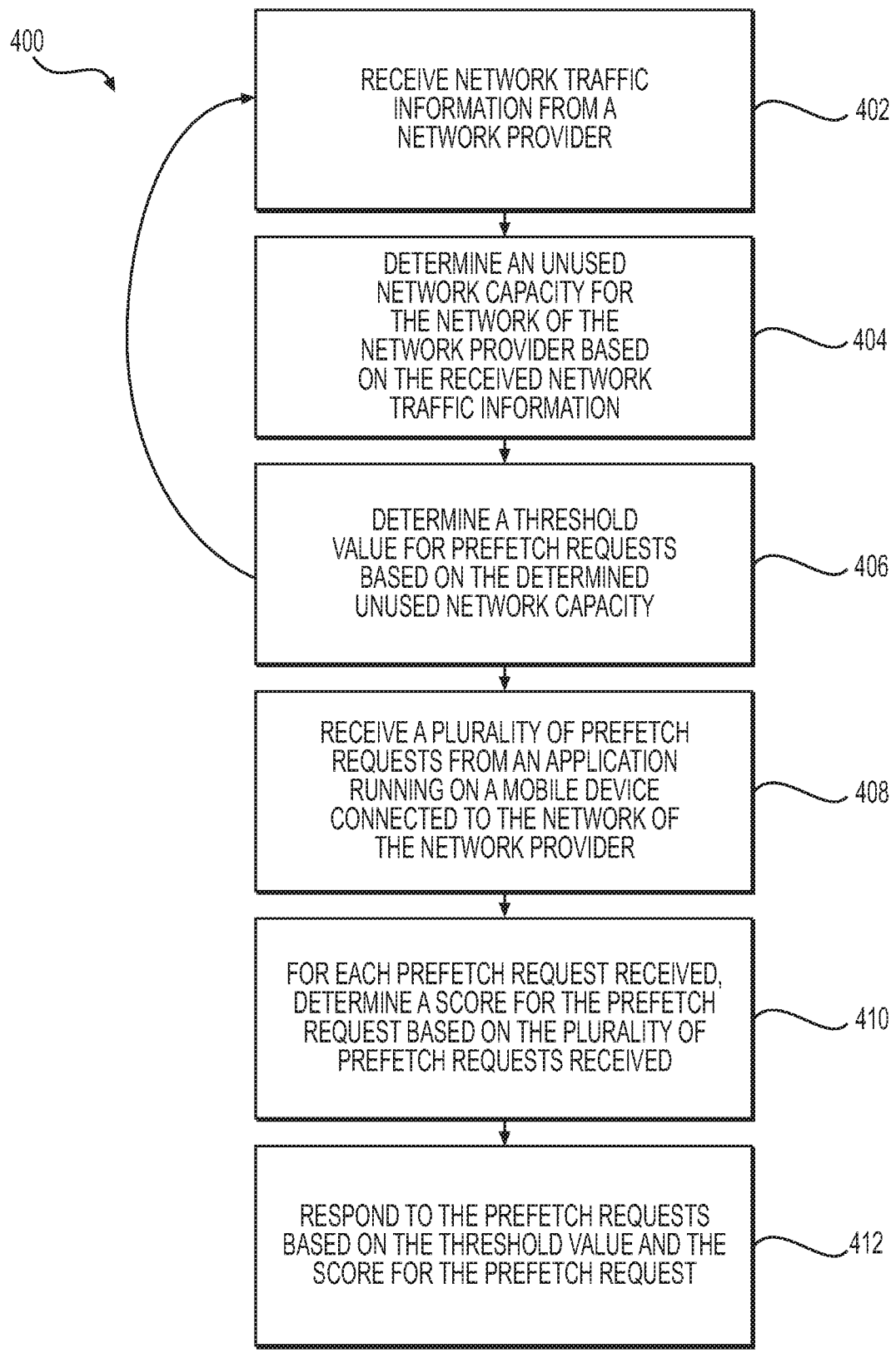
FIG. 4 depicts a block diagram of another method for utilizing unused network capacity for prefetch requests, according to embodiments of the present disclosure.

FIG. 4 depicts a block diagram of another method for utilizing unused network capacity for prefetch requests, according to embodiments of the present disclosure. The method 400 may begin at step 402 in which one or more servers, such as predictive prefetch server 112, may receive, via a network, network traffic information from a network provider. The network traffic information may include raw traffic data and a maximum network capacity.

The method may then proceed to step 404, in which the one or more servers determines an unused network capacity for the network of the network provider based on the received network traffic information from the network provider. For example, the one or more servers may convert raw traffic data into a quantifiable network capacity measure. The one or more servers may then determine the unused network capacity by comparing the quantifiable network capacity measure to the maximum network capacity.

The method may then proceed to step 406, in which the one or more servers may determine a threshold value of prefetch requests to fulfill based on the determined unused network capacity. For example, the one or more servers may determine the threshold value may be a percentage of, or all, of the unused network capacity. As mentioned above, the unused network capacity may be a dynamic threshold value, and the one or more servers may dynamically determine the threshold value based on the received network traffic information.

Then, at step 408, the one or more servers may receive a plurality of prefetch requests from an application running on a mobile device connected to the network of the network provider. Each prefetch request may include a request for content predicted to be requested by the user of the mobile device. Alternatively, or additionally, the one or more servers may receive the plurality of prefetch requests from an application server that transmits and receives data from the application running on the mobile device connected to the network of the network provider. At step 410, the one or more servers may determine a score of each prefetch request based on the plurality of prefetch requests.

At step 412, the one or more servers may respond to the prefetch requests based on the threshold value and the score for each prefetch request. For example, if the score of each prefetch request is greater than or equal to the determined threshold value, then the one or more servers may respond to the prefetch request by fulfilling the prefetch requests. However, if the score of each prefetch request is less than the determined threshold value, then the one or more servers may not respond to the prefetch request. Alternatively, or additionally, the one or more servers may transmit instructions to a server of the network provider, such as network analytics server 110 or a network element of infrastructure network 108, to provide a response to prefetch requests based on the score of each prefetch request and the threshold value.

Figure 5:
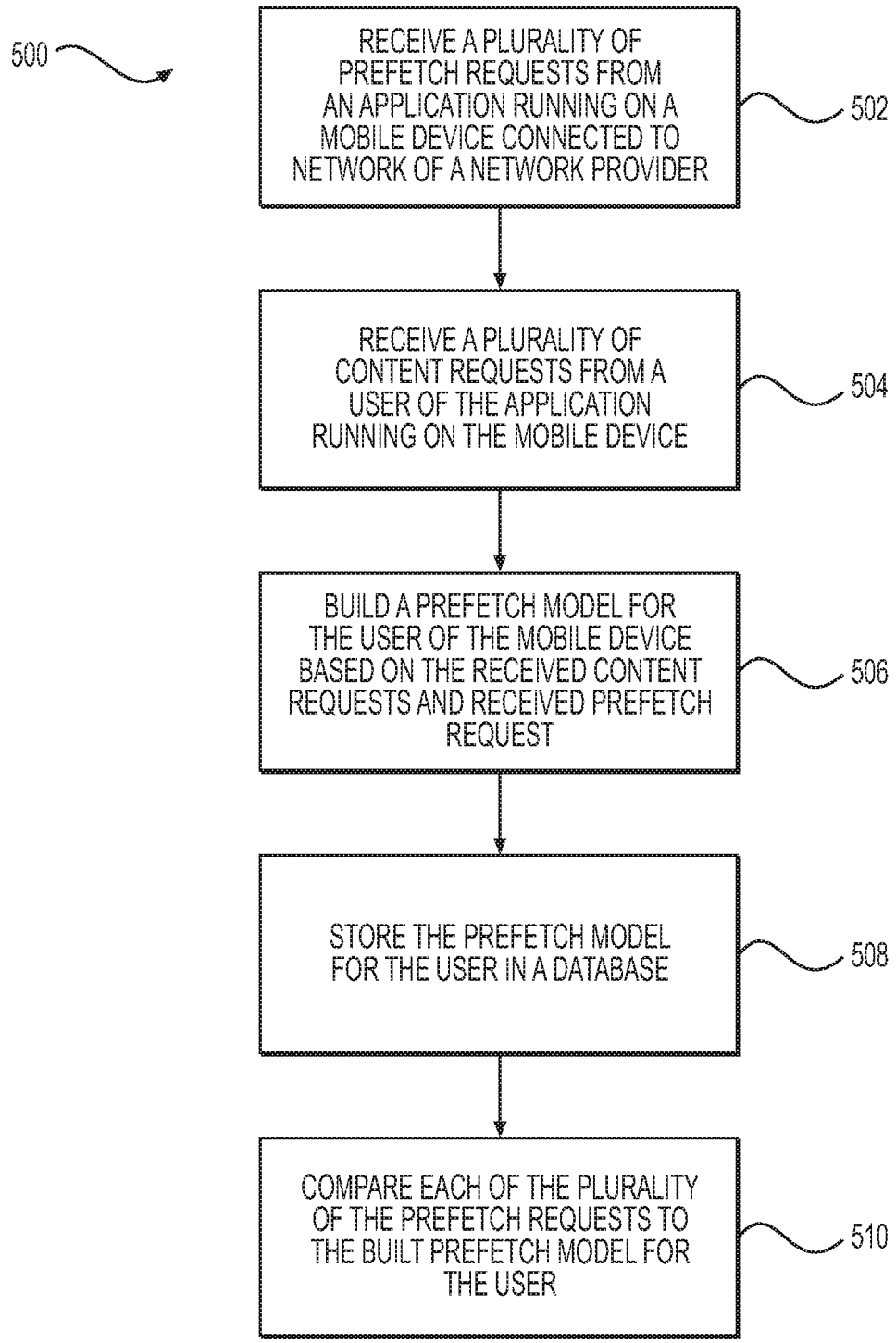
FIG. 5 depicts a block diagram of a method for building a predictive model for prefetch requests, according to embodiments of the present disclosure.

FIG. 5 depicts a block diagram of method for building a predictive model for prefetch requests, according to embodiments of the present disclosure. The method 500 may begin at step 502 in which one or more servers, such as predictive prefetch server 112, may receive, via a network, a plurality of prefetch requests from an application running on a mobile device connected to the network of a network provider. Each prefetch request may include a request for content predicted to be requested by the user of the mobile device.

At step 504, the one or more servers may receive, via the network, a plurality of content requests from a user of the application running on the mobile device. Each content request may include a request for content made by the user in a non-prefetch capacity.

The method may then proceed to step 506, in which the one or more servers may build a prefetch model for the user of the mobile device based on the received plurality of content requests and the received plurality of prefetch requests. Additionally, or alternatively, the one or more servers may build the prefetch model for the user based on user activity history stored in a database, such as predictive prefetch database 112a, a previously stored prefetch model of the user of mobile device stored in the database, and/or one or more prefetch models of other users of mobile devices stored in the database. The one or more servers may build the prefetch model by reviewing the content requests and prefetch requests from mobile device. Then, at step 508, the one or more servers may store the built prefetch model for the user in a database, such as predictive prefetch database 112a.

At step 510, the one or more servers may compare each of the received plurality of prefetch requests to the built prefetch model for the user. For example, the one or more servers may analyze the content of a prefetch request, and compare the content of the prefetch request to the prefetch model. When the prefetch request or the content for the prefetch request matches the prefetch model, the one or more servers may determine that the prefetch requests is a proper prefetch request, e.g., the prefetch request is non-fraudulent.

Figure 6:
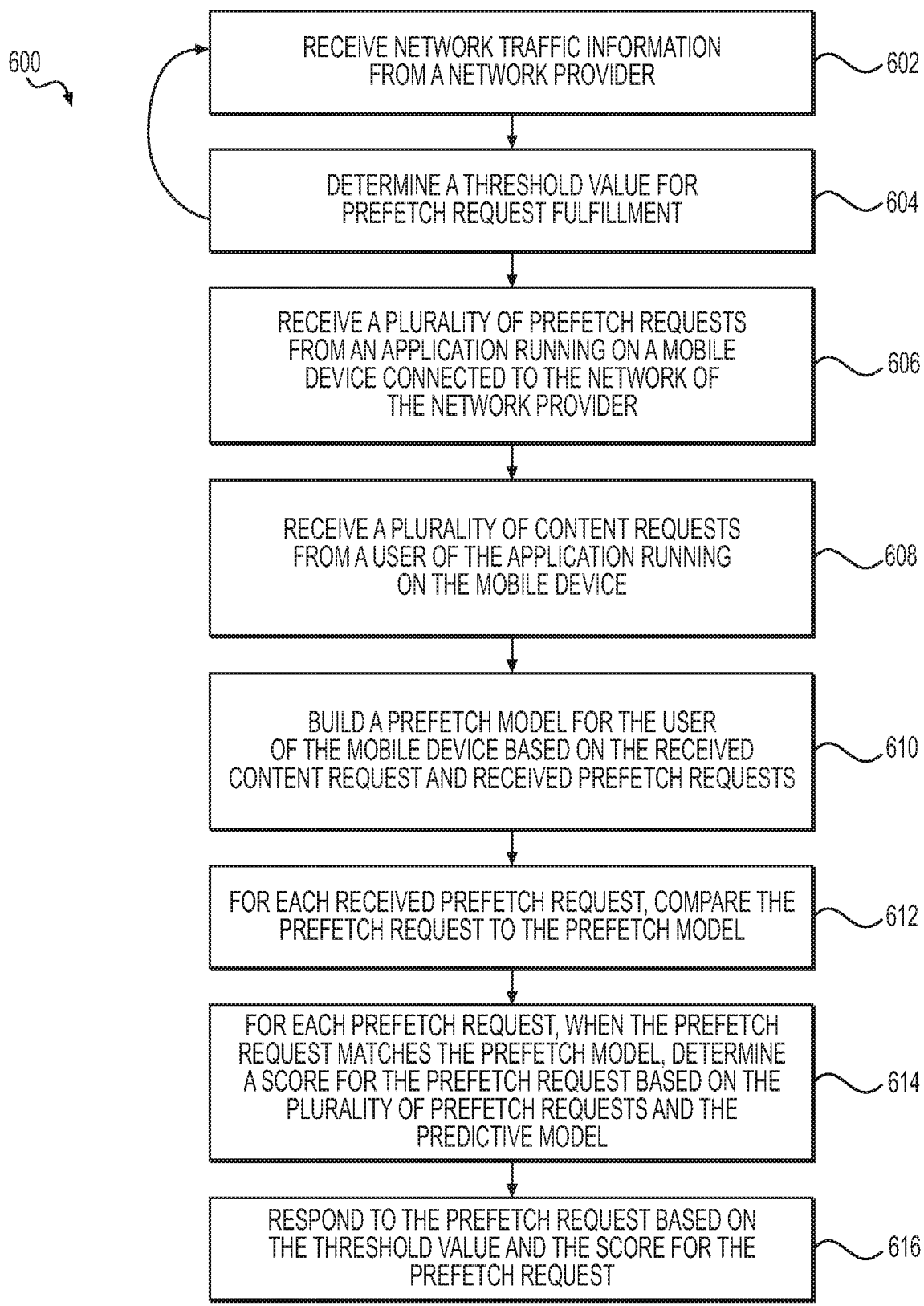
FIG. 6 depicts a block diagram of a method for utilizing unused network capacity for fulfilling prefetch request using a predictive model, according to embodiments of the present disclosure.

FIG. 6 depicts a block diagram of a method for utilizing unused network capacity for fulfilling prefetch requests using a predictive model, according to embodiments of the present disclosure. The method 600 may begin at step 602 in which one or more servers, such as predictive prefetch server 112, may receive, via a network, network traffic information from a network provider. The network traffic information may include one or more of unused capacity information, raw traffic data, and/or a maximum network capacity.

The method may then proceed to step 604, in which the one or more servers may determine a threshold value for prefetch request to fulfill based on the network traffic information. For example, the one or more servers may determine the threshold value may be a percentage of, or all, of the unused network capacity. As mentioned above, the unused network capacity may be a dynamic threshold value, and the one or more servers may dynamically determine the threshold value based on the received network traffic information.

Then, at step 606, the one or more servers may receive, via the network, a plurality of prefetch requests from an application running on a mobile device connected to the network of the network provider. Each prefetch request may include a request for content predicted to be requested by the user of the mobile device.

At step 608, the one or more servers may receive, via the network, a plurality of content requests from a user of the application running on the mobile device. Each content request may include a request for content made by the user in a non-prefetch capacity.

The method may then proceed to step 610, in which the one or more servers may build a prefetch model for the user of the mobile device based on the received plurality of content requests and the received plurality of prefetch requests. Additionally, or alternatively, the one or more servers may build the prefetch model for the user based on user activity history stored in a database, such as predictive prefetch database 112a, a previously stored prefetch model of the user of mobile device stored in the database, and/or one or more prefetch models of other users of mobile devices stored in the database.

At step 612, the one or more servers may compare each of the received plurality of prefetch requests to the built prefetch model for the user. For example, the one or more servers may analyze the content of a prefetch request, and compare the content of the prefetch request to the prefetch model. When the prefetch request or the content for the prefetch request matches the prefetch model, the one or more servers may determine that the prefetch request is a proper prefetch request, e.g., the prefetch request is non-fraudulent.

Then at step 614, the one or more servers, for each prefetch request that matches the prefetch model, may determine a score for the prefetch request based on the plurality of prefetch request and the prefetch model. For example, prefetch request for rapidly changing content, such as status updates and news feeds, may have a lower score and a lower rank, while static content, such as a news article or a video, may have a higher score and a higher rank.

Finally, at step 616, the one or more servers may respond to the prefetch requests based on the threshold value and the score for the prefetch request. For example, if the score of the prefetch request is greater than or equal to the determined threshold value, then the one or more servers may respond to the prefetch request by fulfilling the prefetch requests. For example, the response to the prefetch request may include the content requested by the prefetch request. The mobile device may store the response to the prefetch request in a memory of the mobile device, and when a user requests the content of the prefetch requests, the application may retrieve the content from the memory of the mobile device, which is relatively faster than retrieving the content from over the network of the network provider. However, if the score of the prefetch request is less than the determined threshold value, then the one or more servers may not respond to the prefetch request. Alternatively, or additionally, the one or more servers may transmit instructions to a server of the network provider, such as network analytics server 110 or a network element of infrastructure network 108, to provide a response to prefetch requests based on the score of each prefetch request and the threshold value.

Figure 7:
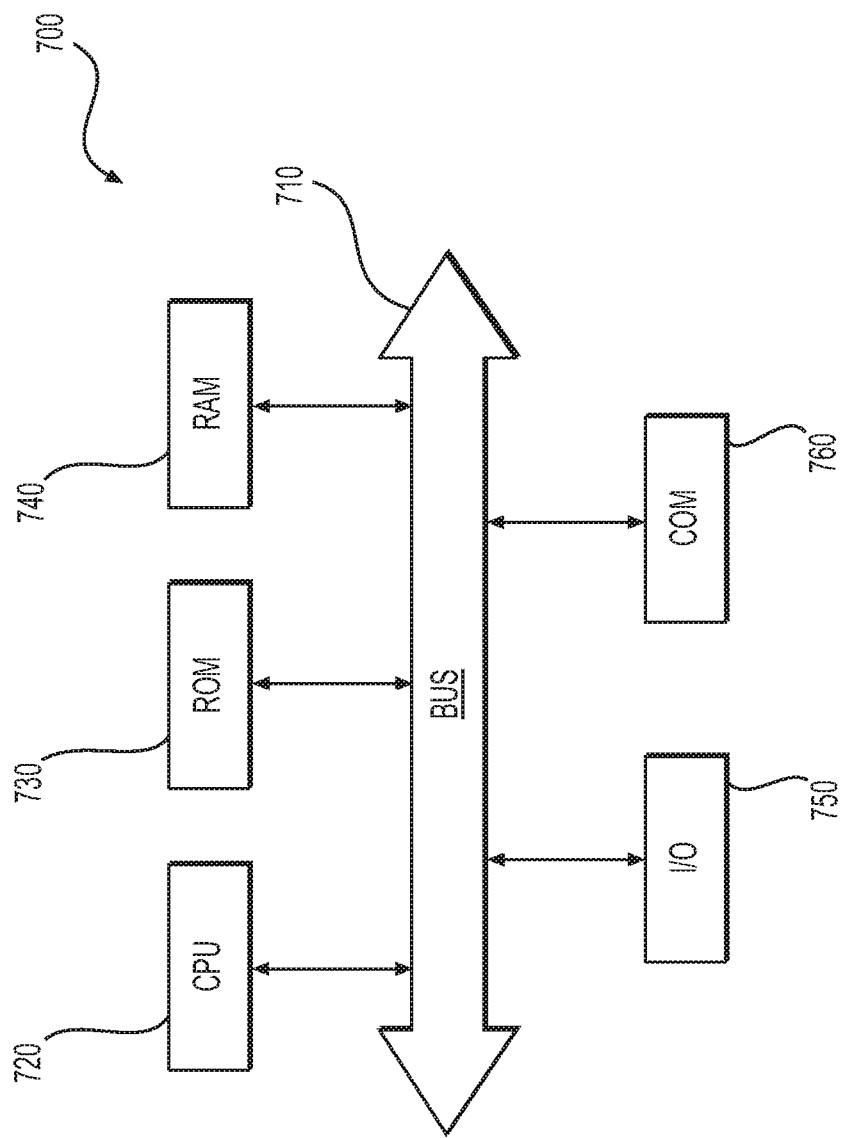
FIG. 7 is a simplified functional block diagram of a computer configured as a device for executing the methods of FIGS. 3-6, according to exemplary embodiments of the present disclosure.

FIG. 7 is a simplified functional block diagram of a computer that may be configured as the mobile devices, servers, nodes and/or network elements for executing the methods, according to exemplary an embodiment of the present disclosure. Specifically, in one embodiment, any of the user devices, servers, and/or exchanges may be an assembly of hardware 700 including, for example, a data communication interface 760 for packet data communication. The platform may also include a central processing unit ("CPU") 720, in the form of one or more processors, for executing program instructions. The platform typically includes an internal communication bus 710, program storage, and data storage for various data files to be processed and/or communicated by the platform such as ROM 730 and RAM 740, although the system 700 often receives programming and data via network communications. The system 700 also may include input and output ports 750 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol.

As will be recognized, the present disclosure is not limited to these particular embodiments. For instance, although described in the context of utilizing unused network capacity for prefetch requests, the present disclosure may also utilized unused network capacity for other requests.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A computer-implemented method for utilizing unused network capacity for prefetch requests, the method comprising:
   receiving, over a network at one or more servers, unused network capacity information from a network provider of the network;
   determining, by the one or more servers, a threshold value for candidate prefetch request fulfillment based on the received unused network capacity information;
   receiving, over the network at the one or more servers, a plurality of candidate prefetch requests from an application running on a mobile device connected to the network of the network provider;
   determining, for each candidate prefetch request of the plurality of candidate prefetch requests by the one or more servers, a score for the candidate prefetch request based on the received plurality of candidate prefetch requests; and
   responding to, for each candidate prefetch request of the plurality of candidate prefetch requests by the one or more servers, the candidate prefetch request based on the determined threshold value and the determined score for the candidate prefetch request.

2. The method of claim 1, further comprising:
   determining, by the one or more servers, an unused network capacity for the network based on the received unused network capacity information, wherein determining the threshold value for candidate prefetch request fulfillment includes: determining the threshold value based on the determined unused network capacity.

3. The method of claim 2, wherein the threshold value is a percentage of the determined unused network capacity.

4. The method of claim 1, wherein determining the score for the candidate prefetch request based on the received plurality of candidate prefetch requests is further based on at least one of a likelihood that a user of the mobile device requests content of the candidate prefetch request, and content of the candidate prefetch request.

5. The method of claim 1, further comprising:
receiving, over the network by the one or more servers, a plurality of content from a user of the application running on the mobile device; and
building, by the one or more servers, a prefetch model for the user of the mobile device based on the received plurality of content requests and the received plurality of candidate prefetch requests.

6. The method of claim 5, further comprising:
comparing, for each candidate prefetch request of the plurality of candidate prefetch requests by the one or more servers, the candidate prefetch request to the prefetch model, wherein determining the score for the candidate prefetch request based on the received plurality of candidate prefetch requests includes:
determining, for each candidate prefetch request of the plurality of candidate prefetch requests by the one or more servers, a score for the candidate prefetch request based on the received plurality of candidate prefetch requests and the prefetch model when the candidate prefetch request matches the prefetch model.

7. The method of claim 1, wherein responding to candidate prefetch request based on the determined threshold value and the determined score for the candidate prefetch request includes:
transmitting, over the network by the one or more servers, instructions to a server of the network provider to provide a response to candidate prefetch request based on the determined threshold value and the determined score for the candidate prefetch request.

8. A system for utilizing unused network capacity for candidate prefetch requests, the system including:
a data storage device that stores instructions for utilizing unused network capacity for candidate prefetch requests; and
a processor configured to execute the instructions to perform a method including:
receiving, over a network, unused network capacity information from a network provider of the network;
determining a threshold value for candidate prefetch request fulfillment based on the received unused network capacity information;
receiving, over the network, a plurality of candidate prefetch requests from an application running on a mobile device connected to the network of the network provider;
determining, for each candidate prefetch request of the plurality of candidate prefetch requests, a score for the candidate prefetch request based on the received plurality of candidate prefetch requests; and
responding to, for each candidate prefetch request of the plurality of candidate prefetch requests, the candidate prefetch request based on the determined threshold value and the determined score for the candidate prefetch request.

9. The system of claim 8, wherein the processor is further configured to execute the instructions to perform the method including:
determining an unused network capacity for the network based on the received unused network capacity information, wherein determining the threshold value for candidate prefetch request fulfillment includes: determining the threshold value based on the determined unused network capacity.

10. The system of claim 9, wherein the threshold value is a percentage of the determined unused network capacity.

11. The system of claim 8, wherein determining the score for the candidate prefetch request based on the received plurality of candidate prefetch requests is further based on at least one of a likelihood that a user of the mobile device requests content of the candidate prefetch request, and content of the candidate prefetch request.

12. The system of claim 8, wherein the processor is further configured to execute the instructions to perform the method including:
receiving, over the network, a plurality of content from a user of the application running on the mobile device; and
building a prefetch model for the user of the mobile device based on the received plurality of content requests and the received plurality of candidate prefetch requests.

13. The system of claim 12, further comprising:
comparing, for each candidate prefetch request of the plurality of candidate prefetch requests, the candidate prefetch request to the prefetch model, wherein determining the score for the candidate prefetch request based on the received plurality of candidate prefetch requests includes:
determining, for each candidate prefetch request of the plurality of candidate prefetch requests, a score for the candidate prefetch request based on the received plurality of candidate prefetch requests and the prefetch model when the candidate prefetch request matches the prefetch model.

14. The system of claim 8, wherein responding to candidate prefetch request based on the determined threshold value and the determined score for the candidate prefetch request includes:
transmitting, over the network, instructions to a server of the network provider to provide a response to candidate prefetch request based on the determined threshold value and the determined score for the candidate prefetch request.

15. A non-transitory computer-readable medium storing instructions that, when executed by a computer, cause the computer to perform a method for utilizing unused network capacity for candidate prefetch requests, the method including:
receiving, over a network, unused network capacity information from a network provider of the network;
determining a threshold value for candidate prefetch request fulfillment based on the received unused network capacity information;
receiving, over the network, a plurality of candidate prefetch requests from an application running on a mobile device connected to the network of the network provider;
determining, for each candidate prefetch request of the plurality of candidate prefetch requests, a score for the candidate prefetch request based on the received plurality of candidate prefetch requests; and
responding to, for each candidate prefetch request of the plurality of candidate prefetch requests, the candidate prefetch request based on the determined threshold value and the determined score for the candidate prefetch request.

16. The computer-readable medium of claim 15, further comprising:

determining an unused network capacity for the network based on the received unused network capacity information, wherein determining the threshold value for candidate prefetch request fulfillment includes: determining the threshold value based on the determined unused network capacity.

17. The computer-readable medium of claim 16, wherein the threshold value is a percentage of the determined unused network capacity.

18. The computer-readable medium of claim 15, wherein determining the score for the candidate prefetch request based on the received plurality of candidate prefetch requests is further based on at least one of a likelihood that a user of the mobile device requests content of the candidate prefetch request, and content of the candidate prefetch request.

19. The computer-readable medium of claim 15, further comprising:

receiving, over the network, a plurality of content from a user of the application running on the mobile device; and building a prefetch model for the user of the mobile device based on the received plurality of content requests and the received plurality of candidate prefetch requests.

20. The computer-readable medium of claim 19, further comprising:

comparing, for each candidate prefetch request of the plurality of candidate prefetch requests, the candidate prefetch request to the prefetch model, wherein determining the score for the candidate prefetch request based on the received plurality of candidate prefetch requests includes:

determining, for each candidate prefetch request of the plurality of candidate prefetch requests, a score for the candidate prefetch request based on the received plurality of candidate prefetch requests and the prefetch model when the candidate prefetch request matches the prefetch model.

* * * * *